(12) United States Patent
Wang et al.

(10) Patent No.: US 12,373,908 B1
(45) Date of Patent: Jul. 29, 2025

(54) DYNAMIC 2D AND 3D VISION-DRIVEN AUTOMATED 3D MOTION GENERATION SYSTEM AND 2D AND 3D VISION-DRIVEN DYNAMIC PROCESS FOR 3D MOTION GENERATION

(71) Applicants: Chingyu Eric Wang, Los Gatos, CA (US); Kamesh Sarangan, Fremont, CA (US)

(72) Inventors: Chingyu Eric Wang, Los Gatos, CA (US); Kamesh Sarangan, Fremont, CA (US)

(73) Assignee: STARTECX INC., Fremont, CA (US)

( * ) Notice: Subject to any disclaimer, the term of this patent is extended or adjusted under 35 U.S.C. 154(b) by 346 days.

(21) Appl. No.: 17/714,765

(22) Filed: Apr. 6, 2022

Related U.S. Application Data

(60) Provisional application No. 63/296,082, filed on Jan. 3, 2022.

(51) Int. Cl.
| | | |
|---|---|---|
| *G06K 9/48* | (2006.01) | |
| *B25J 9/16* | (2006.01) | |
| *B25J 19/02* | (2006.01) | |
| *G06T 1/00* | (2006.01) | |
| *G06T 7/12* | (2017.01) | |

(52) U.S. Cl.
CPC .......... *G06T 1/0014* (2013.01); *B25J 9/1697* (2013.01); *B25J 19/023* (2013.01); *G06T 7/12* (2017.01); *G06T 2207/10012* (2013.01); *G06T 2207/10024* (2013.01)

(58) Field of Classification Search
CPC .............. G06T 1/0014; G06T 7/12; G06T 2207/10012; G06T 2207/10024; B25J 9/1697; B25J 19/023
See application file for complete search history.

(56) References Cited

FOREIGN PATENT DOCUMENTS

| CN | 107300382 A | * | 10/2017 | ............. G01C 11/00 |
|---|---|---|---|---|
| CN | 110260824 A | * | 9/2019 | ............. G01B 11/002 |
| CN | 112102347 A | * | 12/2020 | ............. G06K 9/6218 |
| CN | 112928799 A | * | 6/2021 | ............. G05D 1/0221 |
| CN | 113219999 A | * | 8/2021 | |

* cited by examiner

*Primary Examiner* — Xin Jia
(74) *Attorney, Agent, or Firm* — Plager Schack LLP; Mark H. Plager; Stephen Hallberg

(57) ABSTRACT

A dynamic two-dimensional (2D) and three-dimensional (3D) vision-driven automated 3D motion generation system and a 2D and 3D vision-driven dynamic process for 3D motion generation are disclosed. The dynamic 2D and 3D vision-driven automated 3D motion generation system and the 2D and 3D vision-driven dynamic process for 3D motion generation involves a dynamic method with vision capability to automatically inspect and process a motion-guided robot path.

4 Claims, 4 Drawing Sheets

DYNAMIC 2D AND 3D VISION-DRIVEN AUTOMATED 3D MOTION GENERATION SYSTEM AND 2D AND 3D VISION-DRIVEN DYNAMIC PROCESS FOR 3D MOTION GENERATION

CLAIM OF BENEFIT TO PRIOR APPLICATION

This application claims benefit to U.S. Provisional Patent Application 63/296,082, entitled "2D AND 3D VISION-DRIVEN DYNAMIC SYSTEM AND PROCESS FOR 3D MOTION GENERATION," filed Jan. 3, 2022. The U.S. Provisional Patent Application 63/296,082 is incorporated herein by reference.

BACKGROUND

Embodiments of the invention described in this specification relate generally to part component manufacturing, and more particularly, to a dynamic two-dimensional (2D) and three-dimensional (3D) vision-driven automated 3D motion generation system and the 2D and 3D vision-driven dynamic process for 3D motion generation.

Warping of part components is a common manufacturing issue for wearable device assemblies. The warping of parts/components results in low product quality and yields inefficiencies in the manufacturing process, which all lead to significant loss due to increases in the cost of production to account for the problems.

Currently, the other existing part component manufacturing processes involve manual visual point teaching to set up path points. This is done by a human user and, therefore, is time consuming and costly. The manual process is also complex and inconsistent approaches by different users leads to variations in outcomes. Take together, this typically results in inaccuracies and inefficiencies before the equipment is even utilized for part component manufacture and assembly. As such, the equipment utilized to manufacture and assembly the part components is not always ready to use when the product cavity changes, and it typically takes time and human effort to complete, which is both slow and prone to human errors.

Therefore, what is needed is an automated and more dynamic way of generating 3D motion based on a vision capability that does not vary according to the human user involved, but provides consistent robot machine paths in an automated manner.

BRIEF DESCRIPTION

A novel dynamic two-dimensional (2D) and three-dimensional (3D) vision-driven automated 3D motion generation system, a 2D and 3D vision-driven dynamic process for 3D motion generation, and a path point fitting process using a 2D edge detection algorithm approach are disclosed.

In some embodiments, the dynamic 2D and 3D vision-driven automated 3D motion generation system and the 2D and 3D vision-driven dynamic process for 3D motion generation apply an automated approach to 3D motion generation based on a dynamic method with vision capability to inspect and process a motion guided robot path.

In some embodiments, the path point fitting process using a 2D edge detection algorithm approach comprises (i) capturing a raw 2D image, (ii) sectioning the 2D image, (iii) performing edge detection within the sectioned 2D image, and (iv) finding a polynomial equation for fitting a path point based on X, Y points in a 2D plane of the 2D image. In some embodiments, capturing the raw 2D image comprises capturing a plurality of raw 2D images of a product. In some embodiments, the plurality of raw 2D images captures an entire geometry of the product. In some embodiments, sectioning the 2D image comprises sectioning each of the 2D images in the plurality of 2D images for the entire geometry of the product. In some embodiments, performing edge detection within the sectioned 2D image comprises performing edge detection within each of the sectioned 2D images in the plurality of 2D images for the entire geometry of the product.

In some embodiments, performing edge detection within the sectioned 2D image comprises (i) performing edge detection of an inner grove detected in the sectioned 2D image, (ii) masking out an edge base of points in a masked image, and (iii) thinning the masked image from a center of the masked image. In some embodiments, the edge base of points are detected for an edge in the sectioned 2D image. In some embodiments, finding the polynomial equation for fitting the path point is based on X, Y contour points of the thinned masked image.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
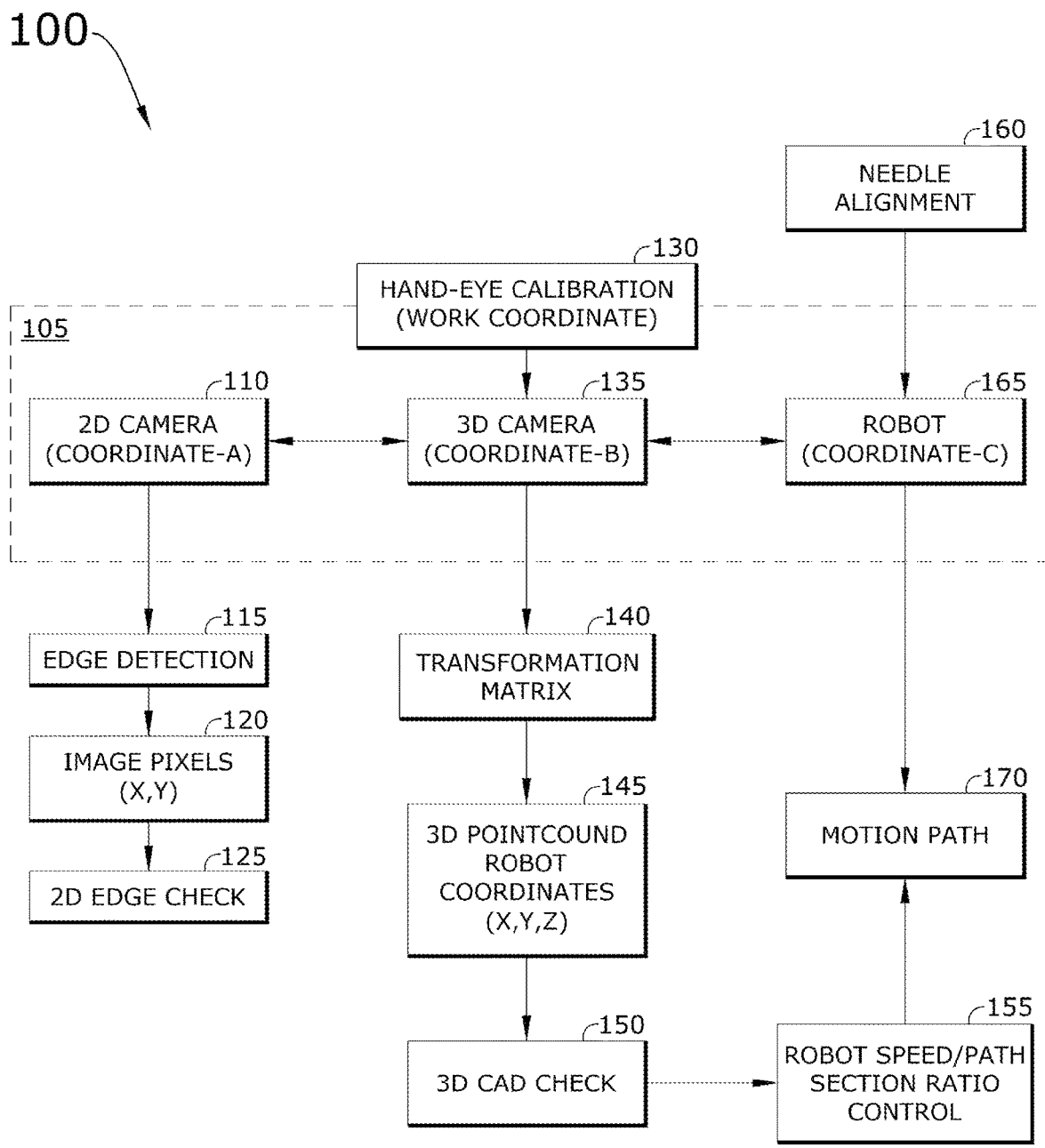
FIG. 1 conceptually illustrates 2D and 3D vision-driven dynamic process for automated 3D motion generation by inspecting and processing a motion guided robot path in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments provide a dynamic two-dimensional (2D) and three-dimensional (3D) vision-driven automated 3D motion generation system, a 2D and 3D vision-driven dynamic process for 3D motion generation, and a path point fitting process using a 2D edge detection algorithm approach.

In some embodiments, the dynamic 2D and 3D vision-driven automated 3D motion generation system and the 2D and 3D vision-driven dynamic process for 3D motion generation apply an automated approach to 3D motion generation based on a dynamic method with vision capability to inspect and process a motion guided robot path.

In some embodiments, the path point fitting process using a 2D edge detection algorithm approach comprises (i) capturing a raw 2D image, (ii) sectioning the 2D image, (iii) performing edge detection within the sectioned 2D image, and (iv) finding a polynomial equation for fitting a path point based on X, Y points in a 2D plane of the 2D image. In some embodiments, capturing the raw 2D image comprises capturing a plurality of raw 2D images of a product. In some embodiments, the plurality of raw 2D images captures an entire geometry of the product. In some embodiments, sectioning the 2D image comprises sectioning each of the 2D images in the plurality of 2D images for the entire geometry of the product. In some embodiments, performing edge detection within the sectioned 2D image comprises performing edge detection within each of the sectioned 2D images in the plurality of 2D images for the entire geometry of the product.

In some embodiments, performing edge detection within the sectioned 2D image comprises (i) performing edge detection of an inner grove detected in the sectioned 2D image, (ii) masking out an edge base of points in a masked image, and (iii) thinning the masked image from a center of the masked image. In some embodiments, the edge base of points are detected for an edge in the sectioned 2D image. In some embodiments, finding the polynomial equation for fitting the path point is based on X, Y contour points of the thinned masked image.

As stated above, warping of part components is a common manufacturing issue for wearable device assemblies. The warping of parts/components results in low product quality and increases inefficiencies in the manufacturing process, which all lead to significant loss due to increases in the cost of production to account for the problems. Currently, the other existing part component manufacturing processes involve manual visual point teaching to set up path points. This is done by a human user and, therefore, is time consuming and costly. The manual process is also complex and inconsistent approaches by different users leads to variations in outcomes. Take together, this typically results in inaccuracies and inefficiencies before the equipment is even utilized for part component manufacture and assembly. So the equipment is not always ready to use when the product cavity changes. Embodiments of the dynamic 2D and 3D vision-driven automated 3D motion generation system and the 2D and 3D vision-driven dynamic process for 3D motion generation described in this specification solve such problems by way of a dynamic and automated approach that screens out bad components before processing and generates a motion path per part to address product tolerance, and thereby yield an efficient assembly process. When implemented and deployed for component part manufacturing, significant savings in costs and overhead is the result.

Embodiments of the dynamic 2D and 3D vision-driven automated 3D motion generation system and the 2D and 3D vision-driven dynamic process for 3D motion generation described in this specification differ from and improve upon currently existing options. In particular, some embodiments of the dynamic 2D and 3D vision-driven automated 3D motion generation system and the 2D and 3D vision-driven dynamic process for 3D motion generation differ from other existing methods which use a laser profiling beam to scan and detect each edge of a product, part, or components by moving the laser head along the product, part, or components geometry lines and comparing this with a pre-defined ground truth CAD file by calculation to compensate for calculated differences to path motion. By contrast, the dynamic 2D and 3D vision-driven automated 3D motion generation system and the 2D and 3D vision-driven dynamic process for 3D motion generation of the present disclosure use a vision camera (with 2D and 3D cameras) to capture the whole product geometry and generate path points instantly. In addition, the laser scanning process of the existing methods involves a significant amount of set-up, calibration, and processing time to use. Furthermore, the linear approach of the existing methods does not effectively address the fundamental issue of part and component warping and/or deformation. Nevertheless, the dynamic 2D and 3D vision-driven automated 3D motion generation system and the 2D and 3D vision-driven dynamic process for 3D motion generation described in this specification solve these problems by way of an automated approach that uses a dynamic method with vision capability (vision camera with 2D and 3D cameras) to inspect and process a motion guided robot path.

The dynamic 2D and 3D vision-driven automated 3D motion generation system and the 2D and 3D vision-driven dynamic process for 3D motion generation of the present disclosure may be comprised of the following elements. This list of possible constituent elements is intended to be exemplary only and it is not intended that this list be used to limit the dynamic 2D and 3D vision-driven automated 3D motion generation system and the 2D and 3D vision-driven dynamic process for 3D motion generation of the present application to just these elements. Persons having ordinary skill in the art relevant to the present disclosure may understand there to be equivalent elements that may be substituted within the present disclosure without changing the essential function or operation of the dynamic 2D and 3D vision-driven automated 3D motion generation system and the 2D and 3D vision-driven dynamic process for 3D motion generation.

1. Six-Axis Collaborative Robot And Controller
2. 2D RGB camera
3. 3D Stereo Vision Camera
4. Machine Vision Lights
5. Edge Detection Algorithm
6. Mid Point and Curve Fitting Algorithm
7. Global Registration
8. Interactive Closest Point
9. Transformation Matrix
10. 3D Point Cloud Robot Coordinates
11. Needle Alignment
12. Motion Path (work coordinates)

In some embodiments, the 2D and 3D vision-driven dynamic system and the process for 3D motion generation of the present disclosure generally work by way of the steps outlined in detail below, by reference to at least FIGS. 1 and 3, and by using the elements noted above in the flow of sequence so that each bad component can be inspected and screened out by machine vision before the actual motion process starts. This is done on a part-by-part (or per part) basis and involves the dynamic approach noted above. In particular, if the comparison of a part with the ground truth CAD file exceeds a threshold, there will be no communication of the needle alignment to the six-axis collaborative robot and controller for motion path output.

By way of example, FIG. 1 conceptually illustrates 2D and 3D vision-driven dynamic process for automated 3D motion generation by inspecting and processing a motion guided robot path 100. As shown in this figure, the 2D and 3D vision-driven dynamic process for automated 3D motion generation by inspecting and processing a motion guided robot path 100 includes several steps that are performed by different components of an automated 3D motion generation system 105. The different components of the automated 3D motion generation system 105 include a 2D camera 110 for determining each coordinate 'A' point, a 3D camera 135 for determining each coordinate 'B' point that is a transformation of the coordinate 'A' point, and a robot 165 for determining each coordinate 'C' point in a pointcloud of robot coordinates. Hand-eye calibration 130 of the 3D camera 135 establishes a work coordinate for the automated 3D motion generation system 105 and needle alignment 160 occurs with respect to the robot 165.

In some embodiments, the 2D camera 110 starts by performing edge detection 115 which is based on image pixels 120 in the 2D plane (X, Y coordinates). Then a 2D edge check 125 is performed.

In some embodiments, the output of the 2D camera 110 is accessed by the 3D camera 135 which uses the transformation matrix 140 to generate the 3D pointcloud robot coordinates 145 in the 3D space (X, Y, Z coordinates). The a 3D computer aided design (CAD) check 150 is performed.

In some embodiments, the robot speed/path section ratio control 155 is then determined for the robot 165, which yields a motion path 170, which the aligned needle 160 will follow automatically by motion of the robot 165. Thus, the automated 3D motion generation system 105 uses 2D and 3D cameras for its vision capabilities and to capture the geometry of the whole item or product and dynamically generate path points both automatically and instantaneously.

Figure 2:
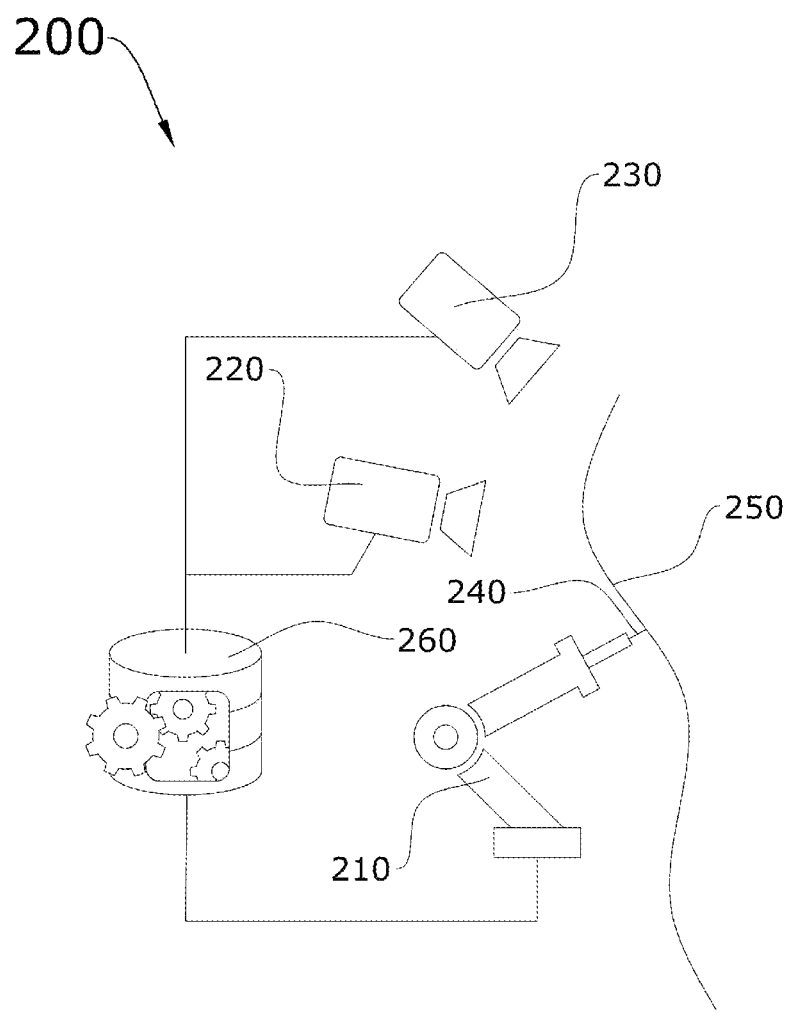
FIG. 2 conceptually illustrates an automated 3D motion generation system that is configured to dynamically inspect and process a motion guided robot path by way of 2D and 3D vision capability in some embodiments.

While the automated 3D motion generation system 105 conceptually illustrates the vision-capable cameras, needle and robot, another example in FIG. 2 presents an automated 3D motion generation system in which an edge is being detected and operation by a controlling computer system Specifically, FIG. 2 conceptually illustrates an automated 3D motion generation system 200 that is configured to dynamically inspect and process a motion guided robot path by way of 2D and 3D vision capability in some embodiments. As shown in this figure, the automated 3D motion generation system 200 comprises a robot arm 210 a 2D camera 220, a 3D camera 230, and a needle 240 that is connected to the robot arm 210. An edge 250 is shown with the needle 240 of the robot arm 210 aligned to the edge 250. Also, a controlling computer 260 is communicably connected to the robot arm 210, the 2D camera 220, and the 3D camera 230.

Thus, in connection with the 2D and 3D vision-driven dynamic process for automated 3D motion generation by inspecting and processing a motion guided robot path 100 described above, by reference to FIG. 1, the 2D camera 220 performs edge detection (at 115) to generate image pixels (at 120) for each edge detected point of 2D imagery of the surface with the edge 250. Similarly the 3D camera 230 uses the transformation matrix to transform (at 140) the 2D edge detection points to a 3D pointcloud of coordinates in 3D space (at 145) for the robot. After the 3D CAD check (at 150), the controlling computer 260 controls the speed and path of the robot arm 210 on section by section pace, automatically, such that the needle 240 automatically moves along the motion path (at 170).

Figure 3:
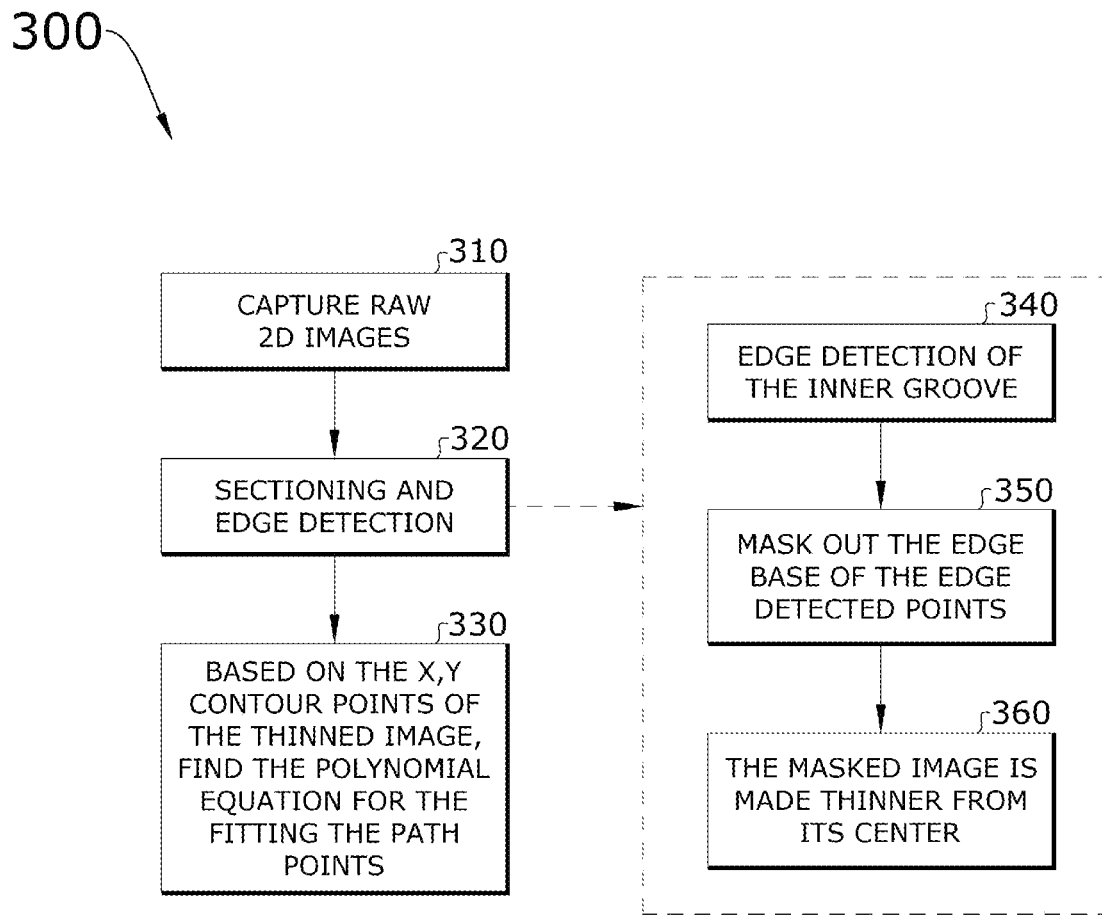
FIG. 3 conceptually illustrates a path point fitting process using a 2D edge detection algorithm approach in some embodiments.

By way of another example, FIG. 3 conceptually illustrates a path point fitting process using a 2D edge detection algorithm approach 300. As shown in this figure, the path point fitting process using a 2D edge detection algorithm approach 300 starts by capturing raw 2D images (at 310). The path point fitting process using a 2D edge detection algorithm approach 300 then performs sectioning and edge detection (at 320). In some embodiments, the sectioning and edge detection (at 320) involves several individual steps. In some embodiments, the individual steps for sectioning and edge detection (at 320) include steps for performing edge detection of the inner grove (at 340) of the detected edge, followed by masking out the edge base of the detected points of the edge (at 350), and finally, making the masked image thinner from its center (at 360). After completing the individual steps (at 340, 350, and 360) of the step for sectioning and edge detection (at 320), the path point fitting process using a 2D edge detection algorithm approach 300 of some embodiments finds the polynomial equation for fitting the path point (at 330) based on the X, Y contour points of the thinned image.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 4:
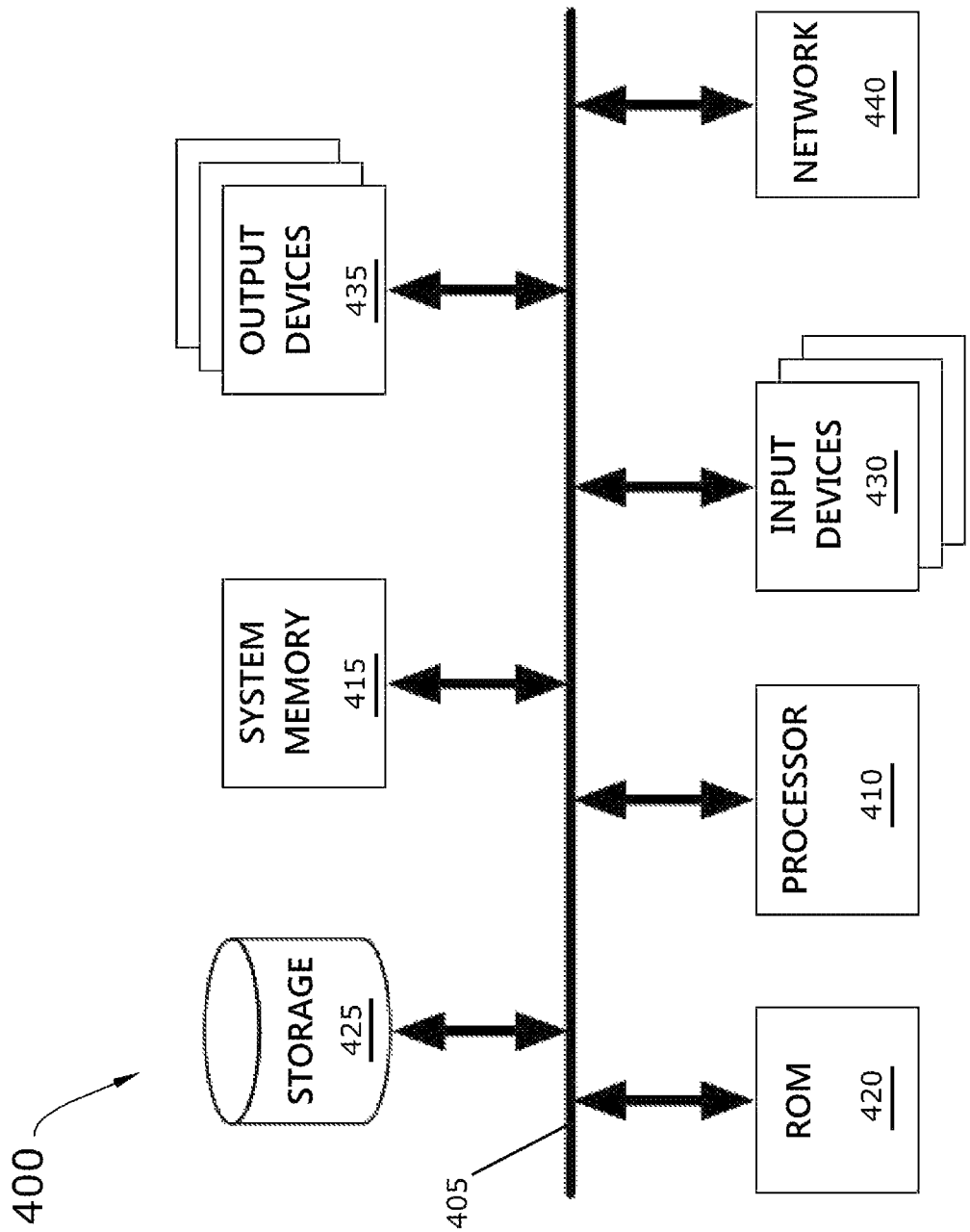
FIG. 4 conceptually illustrates an electronic system with which some embodiments of the invention are implemented.

FIG. 4 conceptually illustrates an electronic system 400 with which some embodiments of the invention are implemented. The electronic system 400 may be a computer, such as the controlling computer 260, a phone, a mobile device, such as a smartphone or a tablet computing device, or any other sort of electronic device. Such an electronic system includes various types of computer readable media and interfaces for various other types of computer readable media. Electronic system 400 includes a bus 405, processing unit(s) 410, a system memory 415, a read-only memory 420, a permanent storage device 425, input devices 430, output devices 435, and a network 440.

The bus 405 collectively represents all system, peripheral, and chipset buses that communicatively connect the numerous internal devices of the electronic system 400. For instance, the bus 405 communicatively connects the processing unit(s) 410 with the read-only memory 420, the system memory 415, and the permanent storage device 425.

From these various memory units, the processing unit(s) 410 retrieves instructions to execute and data to process in order to execute the processes of the invention. The processing unit(s) may be a single processor or a multi-core processor in different embodiments.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some embodiments of the invention use a mass-storage device (such as a magnetic or optical disk and its corresponding disk drive) as the permanent storage device 425.

Other embodiments use a removable storage device (such as a flash drive) as the permanent storage device 425. Like the permanent storage device 425, the system memory 415 is a read-and-write memory device. However, unlike storage device 425, the system memory 415 is a volatile read-and-write memory, such as a random access memory. The system memory 415 stores some of the instructions and data that the processor needs at runtime. In some embodiments, the invention's processes are stored in the system memory 415, the permanent storage device 425, and/or the read-only memory 420. For example, the various memory units include instructions for the 2D to 3D via algorithm and 3D matrix in accordance with some embodiments. From these various memory units, the processing unit(s) 410 retrieves instructions to execute and data to process in order to execute the processes of some embodiments.

The bus 405 also connects to the input and output devices 430 and 435. The input devices enable the user to communicate information and select commands to the electronic system. The input devices 430 include alphanumeric keyboards, pointing devices (also called "cursor control devices"), vision-capable cameras (such as the 2D camera and the 3D camera). The output devices 435 include conventional display devices and the robot with needle, as well as other conventional computer-based output devices, such as printers (2D and 3D printers), monitors, such as cathode ray tubes (CRT), and other display devices, such as liquid crystal displays (LCD) and organic light emitting diode (OLED) display screens. Some embodiments include devices such as a touchscreen that functions as both input and output devices.

Finally, as shown in FIG. 4, bus 405 also couples electronic system 400 to a network 440 through a network adapter (not shown). In this manner, the computer can be a part of a network of computers (such as a local area network ("LAN"), a wide area network ("WAN"), or an intranet), or a network of networks (such as the Internet). Any or all components of electronic system 400 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

The above-described embodiments of the invention are presented for purposes of illustration and not of limitation. While the invention has been described with reference to numerous specific details, one of ordinary skill in the art will recognize that the invention can be embodied in other specific forms without departing from the spirit of the invention. For instance, FIGS. 1 and 3 conceptually illustrate processes. The specific operations of each process may not be performed in the exact order shown and described. Specific operations may not be performed in one continuous series of operations, and different specific operations may be performed in different embodiments. Furthermore, each process could be implemented using several sub-processes (such as the individual steps 340, 350, and 360, as a sub-process of the step 320 for sectioning and edge detection in FIG. 3), or as part of a larger macro process. Thus, one of ordinary skill in the art would understand that the invention is not to be limited by the foregoing illustrative details, but rather is to be defined by the appended claims.

We claim:

1. A dynamic two-dimensional (2D) and three-dimensional (3D) vision-driven automated 3D motion generation system that is configured to provide automated 3D motion generation for component part manufacturing comprising:
   a six-axis collaborative robot and needle that outputs a motion path;
   a vision-capable camera system that produces one or more images ("imagery");
   a controlling computer that is communicably connect to the six-axis collaborative robot and the vision-capable camera system;
   a robot controlling software program that implements (i) an edge detection algorithm that identifies edges in the imagery produced by the vision-capable camera system when the robot controlling software program is running on the controlling computer and (ii) a mid-point and curve fitting algorithm that identifies mid-points of detected edges and identifies a degree to which the detected edges fit to curves when the robot controlling software program is running on the controlling computer; and
   a particular motion path as output by the six-axis collaborative robot and needle.

2. The dynamic 2D and 3D vision-driven automated 3D motion generation system of claim 1, wherein the vision-capable camera system comprises a 2D red-green-blue (RGB) camera.

3. The dynamic 2D and 3D vision-driven automated 3D motion generation system of claim 1, wherein the vision-capable camera system comprises a 3D stereo vision camera.

4. The dynamic 2D and 3D vision-driven automated 3D motion generation system of claim 1 further comprising a plurality of machine vision lights and a 3D point cloud of 3D coordinates for needle alignment by the six-axis collaborative robot and needle.

* * * * *